United States Patent
Miyake

(10) Patent No.: US 11,430,201 B2
(45) Date of Patent: Aug. 30, 2022

(54) IMAGE PROCESSING APPARATUS FOR CHARACTER RECOGNITION, CONTROL METHOD OF THE SAME, STORAGE MEDIUM AND IMAGE PROCESSING SYSTEM

(71) Applicant: CANON KABUSHIKI KAISHA, Tokyo (JP)

(72) Inventor: Yuuya Miyake, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/133,219

(22) Filed: Dec. 23, 2020

(65) Prior Publication Data

US 2021/0201065 A1 Jul. 1, 2021

(30) Foreign Application Priority Data

Dec. 27, 2019 (JP) .............................. JP2019-239276

(51) Int. Cl.
 *G06V 10/24* (2022.01)
 *G06V 10/22* (2022.01)
 *G06V 10/60* (2022.01)
 *G06V 10/44* (2022.01)

(52) U.S. Cl.
 CPC ............ *G06V 10/245* (2022.01); *G06V 10/23* (2022.01); *G06V 10/242* (2022.01); *G06V 10/443* (2022.01); *G06V 10/60* (2022.01)

(58) Field of Classification Search
 CPC ....................................................... G06K 9/00
 See application file for complete search history.

(56) References Cited

U.S. PATENT DOCUMENTS

| 2015/0306304 | A1* | 10/2015 | Schabbach | ............. | G16H 20/17 604/131 |
| 2017/0116494 | A1* | 4/2017 | Isaev | .................. | G06K 9/00449 |
| 2017/0193322 | A1* | 7/2017 | Schiller | .................... | A61B 5/72 |

FOREIGN PATENT DOCUMENTS

JP 2015-197851 A 11/2015

* cited by examiner

*Primary Examiner* — David Perlman
(74) *Attorney, Agent, or Firm* — Cowan, Liebowitz & Latman, P.C.

(57) ABSTRACT

An image processing apparatus acquires a plurality of captured images of characters captured in time series, each of the characters including a plurality of segments, recognize the characters captured for each of the plurality of captured images, and determine which one of the characters recognized from each of the plurality of captured images is to be output. The image processing apparatus determines, in accordance with a change aspect in time series of the characters recognized from each of the plurality of captured images, which one of the characters recognized from each of the plurality of captured images is to be output.

9 Claims, 7 Drawing Sheets

FIG. 4

| No | LIGHTING PATTERN | 1 | 2 | 3 | 4 | 5 | 6 | 7 | Out |
|---|---|---|---|---|---|---|---|---|---|
| 0 | | ON | OFF | ON | ON | ON | ON | ON | 0 |
| 1 | | ON | OFF | ON | OFF | OFF | OFF | OFF | 1 |
| 2 | | OFF | OFF | OFF | OFF | ON | ON | OFF | 1 |
| 3 | | ON | ON | OFF | ON | ON | OFF | ON | 2 |
| 4 | | ON | ON | ON | ON | OFF | OFF | ON | 3 |
| 5 | | ON | ON | ON | OFF | OFF | ON | OFF | 4 |
| 6 | | OFF | ON | ON | ON | OFF | ON | ON | 5 |
| 7 | | OFF | ON | ON | ON | ON | ON | ON | 6 |
| 8 | | OFF | ON | ON | ON | ON | ON | OFF | 6 |
| 9 | | ON | OFF | ON | OFF | OFF | ON | ON | 7 |
| 10 | | ON | OFF | ON | OFF | OFF | OFF | ON | 7 |
| 11 | | ON | ON | ON | ON | ON | ON | ON | 8 |
| 12 | | ON | ON | ON | ON | OFF | ON | ON | 9 |
| 13 | | ON | ON | ON | OFF | OFF | ON | ON | 9 |
| 14 | | OFF | ON | OFF | OFF | OFF | OFF | OFF | - |
| 15 | | OFF | OFF | OFF | OFF | OFF | OFF | OFF | NULL |

CAPTURE AT t1 TO t3

CAPTURE AT t2 TO t4

CAPTURE AT t3 TO t5

CAPTURE AT t4 TO t6

IMAGE PROCESSING APPARATUS FOR CHARACTER RECOGNITION, CONTROL METHOD OF THE SAME, STORAGE MEDIUM AND IMAGE PROCESSING SYSTEM

BACKGROUND OF THE INVENTION

Field of the Invention

The present invention relates to an image processing apparatus for character recognition, a control method of the same, a storage medium, and an image processing system.

Description of the Related Art

Conventionally, there is a known technology in which physical quantities such as temperature, pressure, rotation speed, and distance are measured by using a predetermined sensor, and a display such as a seven-segment display displays a measurement result measured by the sensor.

Additionally, there are instances where such a display is dedicated to a function of displaying a measurement result, and in the case of using such a display, there are instances where recording and saving of a measurement result are performed by using an image capturing apparatus separately provided. That is, there is a known technology in which indication of a display is first captured by an image capturing apparatus and subsequently character recognition processing is performed on a captured image and a measurement result is output or recorded (Japanese Patent Laid-Open No. 2015-197851).

Incidentally, in a case where a character displayed as a plurality of segments is captured by an image capturing apparatus, when indication of a display changes during exposure, there are instances where indication obtained before the change and indication obtained after the change overlap with each other and are captured. For instance, in a case where indication of a number changes from "4" to "5" during exposure and the indication of these numbers overlap with each other, the indication is relatively harmless as long as the indication is captured as indication of a non-existent number, but there are instances where the indication is captured as indication of a different number (for instance, "9").

According to the technology proposed in Japanese Patent Laid-Open No. 2015-197851, in a case where indication of the display is updated and overlapping images are captured during exposure by the image capturing apparatus, there are instances where an erroneous character may be output from the captured images as a measurement result.

SUMMARY OF THE INVENTION

The present disclosure has been made in consideration of the aforementioned issues, and realizes technology in which even in a case where an erroneous character is recognized due to a change of indication of a display, a finally accurate recognition result can be output.

In order to solve the aforementioned problems, one aspect of the present disclosure provides an image processing apparatus comprising: one or more processors; and a memory storing instructions which, when the instructions are executed by the one or more processors, cause the image processing apparatus to function as: a recognition unit configured to acquire a plurality of captured images of characters captured in time series, each of the characters including a plurality of segments, and recognize the characters captured for each of the plurality of captured images; and a determination unit configured to determine which one of the characters recognized from each of the plurality of captured images is to be output, wherein the determination unit determines, in accordance with a change aspect in time series of the characters recognized from each of the plurality of captured images, which one of the characters recognized from each of the plurality of captured images is to be output.

Another aspect of the present disclosure provides, an image processing system comprising: an image capturing unit configured to generate a plurality of captured images of characters captured in time series, each of the characters including a plurality of segments; and an image processing apparatus comprising: one or more processors; and a memory storing instructions which, when the instructions are executed by the one or more processors, cause the image processing apparatus to function as: a recognition unit configured to acquire a plurality of captured images of characters captured in time series, each of the characters including a plurality of segments, and recognize the characters captured for each of the plurality of captured images; and a determination unit configured to determine which one of the characters recognized from each of the plurality of captured images is to be output, wherein the determination unit determines, in accordance with a change aspect in time series of the characters recognized from each of the plurality of captured images, which one of the characters recognized from each of the plurality of captured images is to be output.

Still another aspect of the present disclosure provides, a control method of an image processing apparatus, the control method comprising: acquiring a plurality of captured images of characters captured in time series, each of the characters including a plurality of segments, and recognizing the characters captured for each of the plurality of captured images; and determining which one of the characters recognized from each of the plurality of captured images is to be output, wherein the determining includes determining, in accordance with a change aspect in time series of the characters recognized from each of the plurality of captured images, which one of the characters recognized from each of the plurality of captured images is to be output.

Yet another aspect of the present disclosure provides, a non-transitory computer-readable storage medium comprising instructions for performing the control method of an image processing apparatus, the control method comprising: acquiring a plurality of captured images of characters captured in time series, each of the characters including a plurality of segments, and recognizing the characters captured for each of the plurality of captured images; and determining which one of the characters recognized from each of the plurality of captured images is to be output, wherein the determining includes determining, in accordance with a change aspect in time series of the characters recognized from each of the plurality of captured images, which one of the characters recognized from each of the plurality of captured images is to be output.

According to the present invention, even in a case where an erroneous character is recognized due to a change of indication of a display, a finally accurate recognition result can be output.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view illustrating a table for number recognition in lighting and non-lighting patterns of the segment display according to the first embodiment.

DESCRIPTION OF THE EMBODIMENTS

First Embodiment

Figure 1:
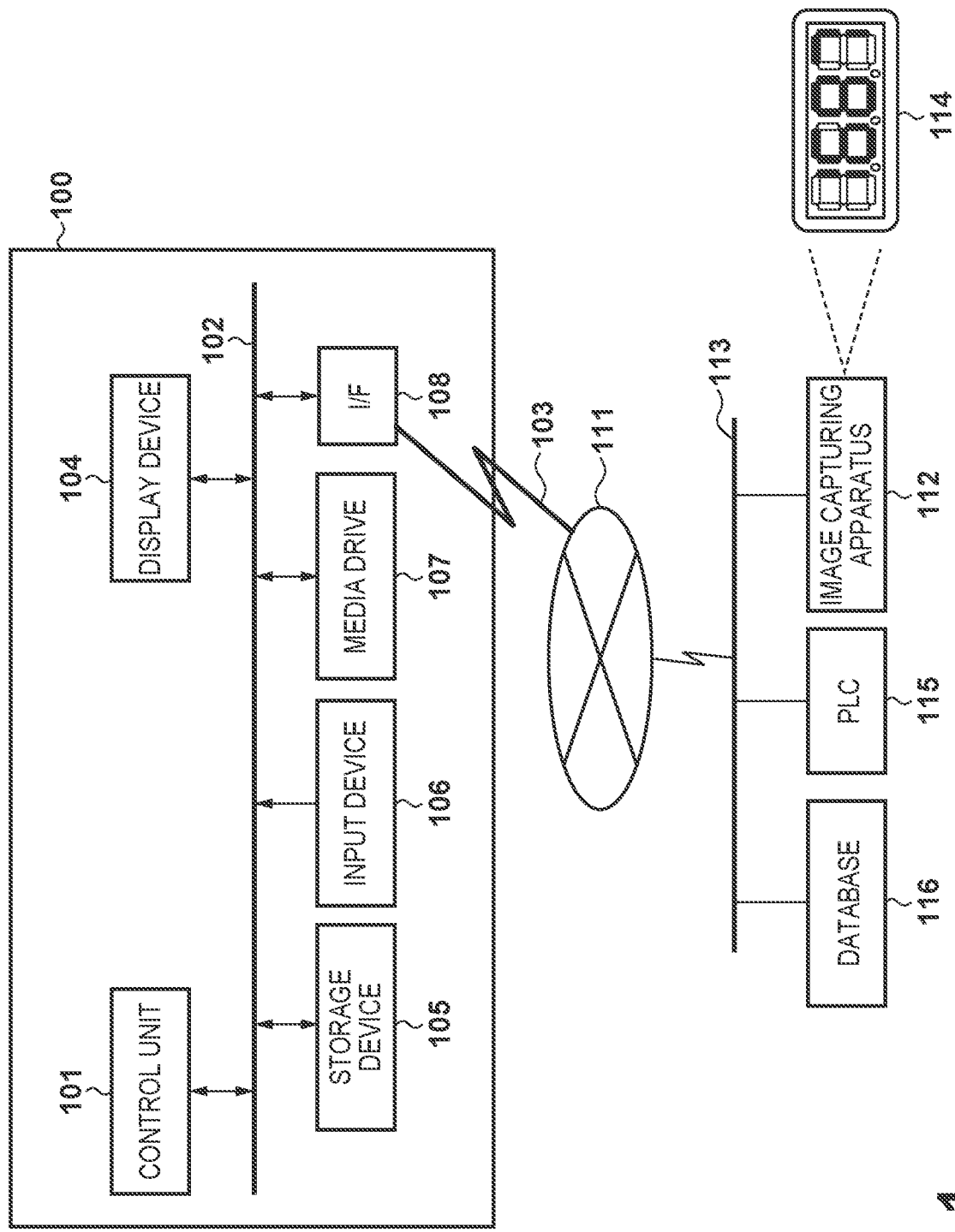
FIG. 1 is a block diagram illustrating an example of an overall configuration of an image processing system and a functional configuration example of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Although in the following description, processing of recognizing a number displayed by using a plurality of segments will be described using the present embodiment as an example, character recognition processing in which other characters displayed using a plurality of segments are recognized, is also applicable. Additionally, in the following description, an example in which an information processing server is used as a computer that can perform number recognition processing (character recognition processing) will be described using an image processing apparatus as an example. However, the present embodiment is also applicable to other devices that can perform the number recognition processing (character recognition processing) without being limited to an information processing server as a computer. Such devices may include, for instance, a personal computer, a digital camera, a mobile phone including a smartphone, a game machine, a tablet terminal, a monitoring camera system, or the like.

FIG. 1 illustrates a configuration example of an image processing system including an image processing apparatus 100 according to the present embodiment. The image processing system illustrated in FIG. 1 generally includes the image processing apparatus 100, an image capturing apparatus 112, a PLC 115, a database 116, and a network 111. In the image processing system, the image capturing apparatus 112 generates an image obtained by capturing indication of a display 114, and the image processing apparatus 10 performs processing such as number recognition processing and output determination processing described below on a captured image.

The image processing apparatus 100 includes respective components described below such as a control unit 101, a display device 104, a storage device 105, and an input device 106. The control unit 101 includes one or more processors such as a CPU, a ROM that is a non-volatile memory, and a RAM that is a volatile memory. The control unit 101 controls all the image processing apparatus 100 by loading and executing, on the RAM, a program stored in the ROM. The program may include an operation processing procedure of the control unit 101 (for instance, a program of computer startup processing or basic input/output processing), and a program for number recognition processing and output determination processing described below. The RAM functions as a main memory of the processor and provides a work area when the CPU executes various types of processing.

The display device 104 includes, for instance, a liquid crystal or an organic EL panel, and displays an application program executed under control of the control unit 101, that is, an execution status of an application program, an image from a digital camera, or the like. The storage device 105 includes, for instance, a hard disk drive (hereinafter, HDD), a solid state drive (hereinafter, SSD) or the like, and saves an application program, data, a library, or the like. The input device 106 includes, for instance, a pointing device, a keyboard or the like, and accepts an operation instruction from a user of the image processing apparatus 100.

A media drive 107 includes, for instance, a storage medium mounting unit (media drive), and enables reading out data of an image captured by the image capturing apparatus 112 that is an external apparatus when a removable storage medium (non-volatile memory device) is mounted on the media drive 107.

A network interface 108 (also simply referred to as an I/F 108) transmits and receives data to and from a device that can communicate such as the image capturing apparatus 112, via a communication line 103 and the network 111. For instance, the control unit 101 transmits information of an image capture instruction to the image capturing apparatus 112 via the network interface 108, or receives a captured image from the image capturing apparatus 112.

A system bus 102 includes an address bus, a data bus, and a control bus connecting respective units of the image processing apparatus 100 described above.

The image capturing apparatus 112 includes, for instance, a digital camera, and is connected to the network 111 via a communication path 113. The image capturing apparatus 112 periodically captures an image of the display 114 described below, and generates gray scale image data, for instance. Then, the image capturing apparatus 112 transmits the image data to the image processing apparatus 100 via the network 111. The image data received by the image processing apparatus 100 is saved in the storage device 105 as image data to be processed.

The display 114 includes a segment display to be measured, and displays a predetermined character by controlling lighting of a plurality of segments. For instance, in the present embodiment, the segment display that displays physical quantity such as temperature, pressure, rotation speed, or a distance measured by a measuring device (not illustrated) as a number by switching lighting and non-lighting of seven segments will be described as an example.

The PLC (Programmable Logic Controller) 115 is a control device used to control an operation of the image processing apparatus 100 in combination with an external device other than the image processing apparatus 100. In a case of executing an application program of the image processing apparatus 100 in combination with the external device, the PLC 115 transmits information of an execution instruction to the image processing apparatus 100. Additionally, the PLC 115 can store an execution result of an application program of the image processing apparatus 100 in a register of the PLC 115, and the execution result can be used for combination with another external device.

On the other hand, the control unit 101 of the image processing apparatus 100 can save an execution result of an application program of the image processing apparatus 100 in the PLC 115 or the database 116. In this case, the control unit 101 transmits the execution result from the network interface 108 to the PLC 115 or the database 116 via the network 111.

The database 116 enables retrieving or registering data via a network, and for instance, receives an execution result of an application program of the image processing apparatus 100 and saves the execution result in the database.

Note that, in the present embodiment, time required for switching indication (for instance, a number) of the display 114 is sufficiently shorter than exposure time of the image capturing apparatus 112. Thus, even when time required for switching indication extends across exposure time for capturing two images, influence on the captured images is extremely small and there is no influence on number recognition processing. Additionally, a sampling period of the measuring device in the present embodiment will be described assuming that the sampling period is sufficiently longer than a frame rate of the image capturing apparatus 112, and measurement by the measuring device is not performed twice or more during capture of three images in the present embodiment.

Aspects of Indication in Display

Figure 2:
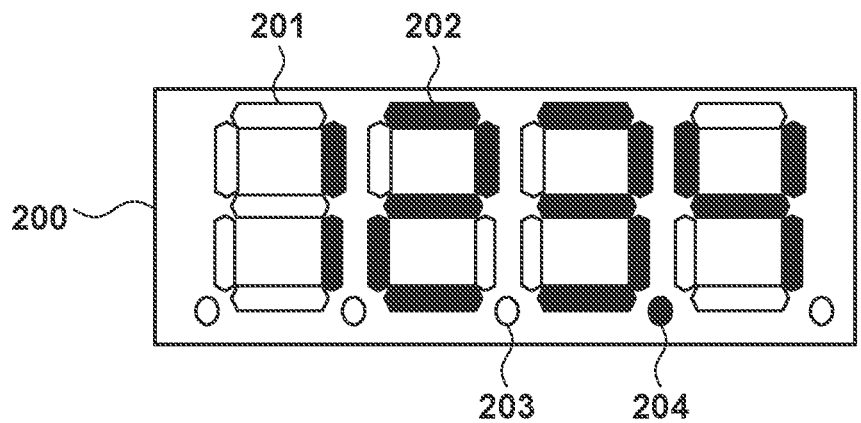
FIG. 2 is a view illustrating indication of a segment display according to the first embodiment.

Next, an aspect of indication of the display 114 (segment display) will be described by referring to FIG. 2. A character (here, a number) displayed by the display 114 is recognized by the image processing apparatus 100 by using a captured image.

A display unit 200 includes a segment including an LED or liquid crystal, and displays, as a number, a measurement value of the measuring device that measures physical quantity such as temperature and pressure described above. In the display unit 200, for instance, segments of LEDs or liquid crystal at seven positions are provided as a set, and a single character (here, number) is formed by lighting or non-lighting patterns of the set of segments. In the example illustrated in FIG. 2, a segment 201 is a non-lighting part and a segment 202 is a lighting part. In the example of the display unit 200 illustrated in FIG. 2, an example of displaying a measurement value "123.4" by using four sets of segments is indicated.

Note that indication of the display 114 is not limited to this example, and, for instance, the display unit 200 may include a display panel such as a liquid crystal panel. In this case, an image representing a character (here, a number) displayed by a set of segments may be displayed on the display panel of the display unit 200.

In a case where each segment of the display unit 200 includes an LED, the lighting part of a set of segments (lighting segments) is displayed brighter than a background or the non-lighting part (that is, non-lighting segments). Additionally, in a case where each segment of the display unit 200 includes liquid crystal, the lighting part of a set of segments is displayed darker than a background or the non-lighting part.

The display unit 200 may include a decimal point display unit 203 that represents a decimal point. In the case of a display that can display a decimal point, the decimal point display unit is disposed at a lower right position of the display unit that displays a numerical value. The decimal point display unit 203 exemplified in FIG. 2 indicates an example in which the decimal point display unit is not lighting, and a decimal point display unit 204 indicates an example in which the decimal point display unit is lighting. In this way, in a case where a measurement value to be displayed has a decimal point, the display unit 200 represents a measurement value having a decimal point by switching lighting and non-lighting of the decimal point display unit at an appropriate position.

Number Recognition Processing

Next, by referring to FIGS. 3 and 4, processing executed by the image processing apparatus 100 of recognizing a character displayed by the display 114 (the processing will also simply be referred to as number recognition processing) will be described.

In the number recognition processing, the image processing apparatus 100 first extracts, from a captured image of the display 114, a region in which the display unit 200 is displayed. Then, the extracted region of the display unit 200 is further divided into a single-digit region (referred to as a single-character region), and the number recognition processing is executed in the divided single-character region. FIG. 3 illustrates an example of image data of a single-character region of a captured image.

Figure 3:
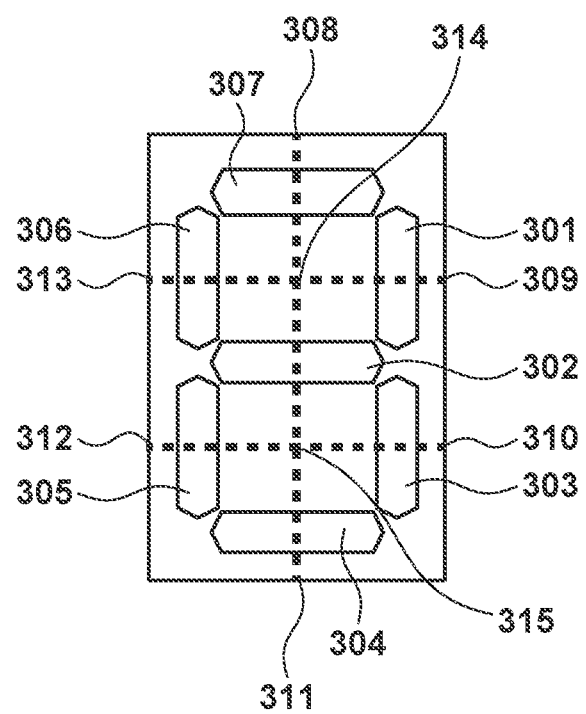
FIG. 3 is a view illustrating a configuration in which a single digit of the segment display according to the first embodiment is displayed.

FIG. 3 illustrates seven segments 301 to 307 in a single-character region. Hereinafter, segments 301 to 307 are also referred to as segNo. 1 to segNo. 7, respectively.

A point 308 is a point that bisects a top border constituting image data of the single-character region. Additionally, a point 309 and a point 310 are points that trisect a right border constituting image data of the single-character region. For instance, it is assumed that an upper point is the point 309 and a lower point is the point 310. A point 311 is a point that bisects a bottom border constituting image data of the single-character region. Further, a point 312 and a point 313 are points that trisect a left border of image data of the single-character region. It is assumed that an upper point is the point 313 and a lower point is the point 312.

An intersecting point 314 is an intersecting point of a straight line connecting the point 308 and the point 311, and a straight line connecting the point 313 and the point 309. Additionally, an intersecting point 315 is an intersecting point of a straight line connecting the point 308 and the point 311 and a straight line connecting the point 312 and the point 310.

In the case of determining whether segNo. 1 (segment 301) is lighting or not lighting, the control unit 101 sequentially reads pixel values from the point 309 to the intersecting point 314, and determines whether there exists a pixel having a luminance equal to or greater than a constant value. In a case where the control unit 101 determines that there exists a pixel having a luminance equal to or greater than a constant value, it is assumed that segNo. 1 is lighting and a determination result related to a lighting state of the segment is stored in the RAM in association with segNo. 1. On the other hand, in a case where the control unit 101 determines that there exists no pixel having a luminance equal to or greater than a constant value, it is assumed that segNo. 1 is not lighting and a determination result is stored in the RAM in association with segNo. 1.

Note that the above-described lighting determination method is a determination method applicable in a case where the display 114 such as an LED is a segment having a higher luminance in a state where the display 114 is lighting than in the non-lighting state. On the other hand, in a case where the display 114 includes, for instance, liquid crystal, a different method may be used as the method for determining whether the segment is lighting or not lighting. For instance, the control unit 101 sequentially reads pixel values from the point 309 to the intersecting point 314, and determines whether there exists a pixel having a luminance equal to or less than a constant value. Then, in a case where the control unit 101 determines that there exists a pixel having a luminance equal to or less than a constant value, it is assumed that segNo. 1 (segment 301) is lighting, and a determination result is stored in the RAM in association with segNo. 1.

Similarly, as for segNo. 2 (segment 302), the control unit 101 sequentially reads pixel values from the intersecting point 314 to the intersecting point 315, and determines whether or not the segment is lighting by the above-described method. Then, a determination result is stored in the RAM in association with segNo. 2. Similarly, the control unit 101 sequentially reads pixel values from the point 310 to the intersecting point 315 as for segNo. 3, and sequentially reads pixel values from the point 311 to the intersecting point 315 as for segNo. 4, and performs similar processing. Further, the control unit 101 sequentially reads pixel values from the point 312 to the intersecting point 315 as for segNo. 5, sequentially reads pixel values from the point 313 to the intersecting point 314 as for segNo. 6, and sequentially reads pixel values from the point 308 to the intersecting point 314 as for segNo. 7, and performs similar processing.

FIG. 4 illustrates a relation between a determination result related to a lighting state of each segment and a number displayed.

A management number column 401 is a column in which a management number for uniquely specifying data in a table is described. A lighting pattern 402 is a column in which a pattern in a lighting state is indicated. Columns 403 to 409 are columns in which lighting conditions of corresponding segNo. 1 to segNo. 7 are indicated, respectively. A column 410 is a column in which an output value to be determined is represented.

Additionally, a row 411 to a row 426 corresponding to specific management numbers have respective output values (numerical values) associated with lighting conditions of corresponding segments. For instance, in a case where segNo. 1 to segNo. 7 are all ON, lighting states of the segments match a pattern indicated in the row 422. Thus, in the lighting states, an output value to be output becomes 8. Additionally, for instance, in a case where only segNo. 2 is ON and all the other segments are OFF, lighting states of the segments match the row 425. Thus, in the lighting states, an output value to be output becomes "–" (minus).

In this way, the control unit 101 holds, in the RAM, a determination result of the lighting state of each segment obtained by using the determination method illustrated in FIG. 3. Then, the control unit 101 uses the table of FIG. 4 to search for a row indicating a lighting state that matches the determination result of the lighting state. At this time, in a case where there exists a row that matches the determination result of the lighting state, a value (output value) of the column 410 of the matching row is held in the RAM as a number recognition result. On the other hand, in a case where a row that matches the determination result is not found, the control unit 101 holds the determination result in the RAM as recognition failure. The control unit 101 performs similar processing on each of numbers displayed by the display 114, and holds a recognized number in the RAM.

Relation Between Change of Indication of Display and Imaging Timing

Next, by referring to FIG. 5, a relation between a change of indication of the display 114 and imaging timing by the image capturing apparatus 112 will be described.

As described above, a measurement value displayed by the display 114 is a measurement result of measurement performed by a measurement device for each sampling period. In the example illustrated in FIG. 5, a temporal change related to timing at which a measurement value displayed by the display 114 changes from "2" to "5."

A time axis 500 represents a temporal change, and each of t1 to t6 indicates timing at which the image capturing apparatus 112 starts exposure. Indication 501 represents a measurement value displayed by the display 114. The example illustrated in FIG. 5 indicates that a measurement value displayed at time t1 to t4 is "2" (indication 50a). Additionally, it is indicated that a measurement value displayed at time t5 to t6 is "5" (501b). At this time, a measurement value displayed changes from "2" (indication 501a) to "5" (501b) between t4 and t5.

A captured image 502 is an image obtained by the image capturing apparatus 112 that has started exposure and captured the display 114 at the timing t1 to t6. In the present embodiment, an image to be captured is a gray scale image, and the gray scale image is generally classified into the following three types of regions. The first type is a region (region 503) where a state of a segment of the display 114 is the non-lighting state. The second type is a region (region 504) where a state of a segment of the display 114 is the lighting state. Then, the third type is a region (region 505) where a state of a segment changes during exposure, and is a region having a luminance of an intermediate state between the lighting state and the non-lighting state.

Ina case where exposure is started at the timing t1 to 3, a captured image 502a in which the display 114 displays a measurement value "2" is obtained. In a case where exposure is started at the timing t5 to t6, a captured image 502b in which the display 114 displays a measurement value "5" is obtained. On the other hand, in a case where exposure is started at the timing t4, a measurement value changes from "2" to "5" while the image capturing apparatus 112 is performing exposure. Thus, a captured image 502c becomes an image in which a changed segment includes a luminance of an intermediate state between the lighting state and the non-lighting state.

In the case of the captured image 502a or 502b, the control unit 101 can detect a measurement value "2" in the image 502a by comparing with the table illustrated in FIG. 4 according to the determination method of the lighting state illustrated in FIG. 3. On the other hand, a measurement value "5" can be obtained in the image 502b. In contrast, in a case where a captured image is the captured image 502c captured at timing t4, the lighting state cannot be obtained accurately. In this case, there is a possibility that a number recognition result that is not applied to a number in the table such as the row 426 illustrated in FIG. 4 is output, or a number recognition result "8" that is different from the measurement value displayed by the display 114 is output. In the following description, processing (output determination processing) that enables outputting of an appropriate number (character) as an output value even in a case where a captured image such as the captured image 502c is present will be described.

Figure 6:
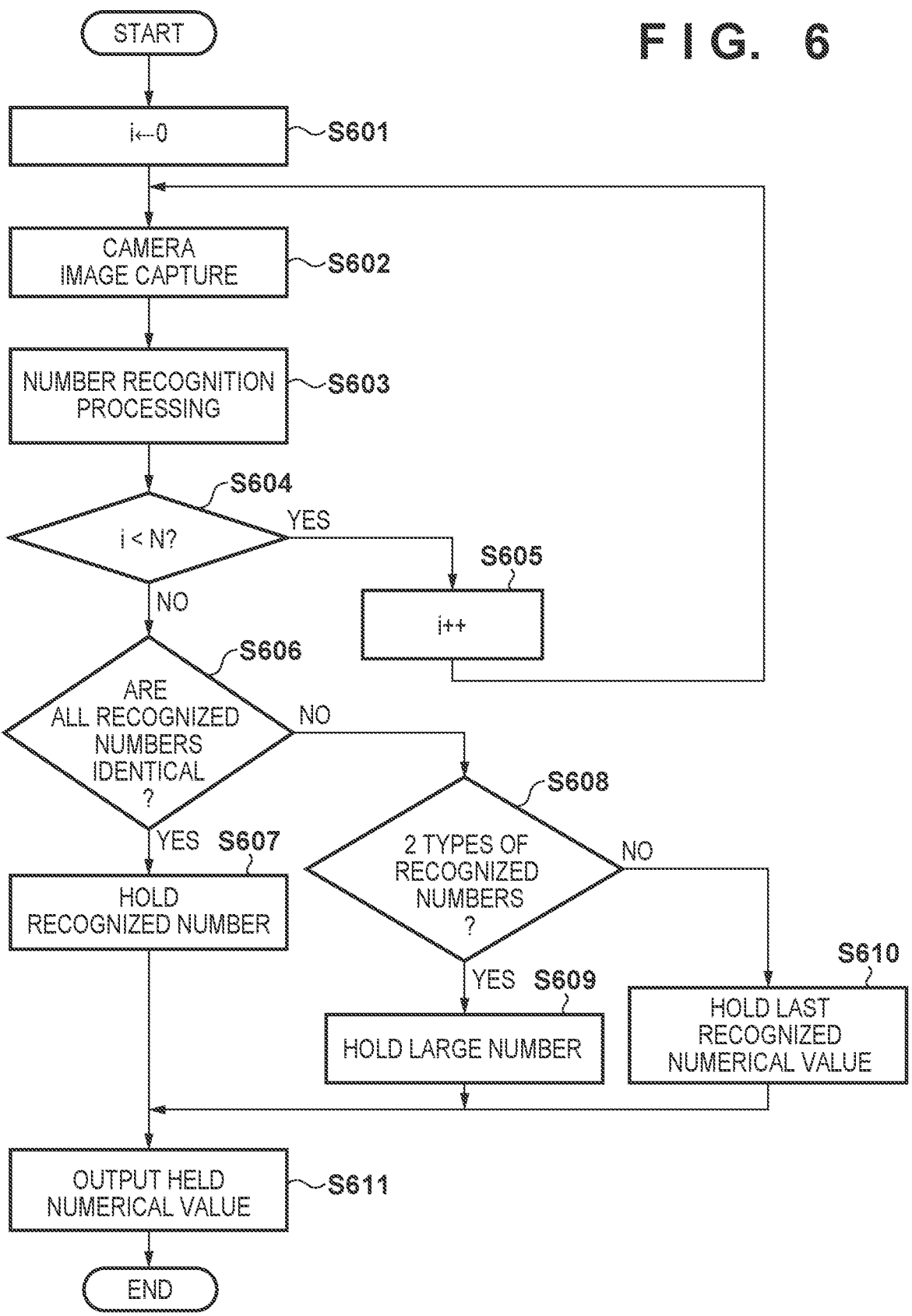
FIG. 6 is a flowchart illustrating a sequence of operations of output determination processing of the image processing apparatus according to the first embodiment.

Series of Operations Related to Output Determination Processing Using Time Series Images Next, a series of operations of output determination processing using time series images according to the present embodiment will be described, by referring to FIG. 6. The output determination processing is processing in which a recognition result (number in this example) of each of time series captured images is used to determine which recognition result (number) among a plurality of recognition results is to be output. A series of operations related to the output determination processing are realized by the control unit 101 that loads and executes, on the RAM, a number recognition application program stored in the ROM. Additionally, initial setting of the image processing apparatus 100 is completed after activation and the image processing apparatus 100 is in an execution waiting state of the processing, and starts by receiving a start operation from the input device 106 or via the network. The initial setting includes setting of PTZ (pan/tilt/zoom) of the image capturing apparatus 112 to keep the display 114 within a field of view. Additionally, the initial setting includes appropriately setting a number recognition processing parameter for the number recognition application program, such as a luminance threshold value for determining the lighting state of the segment described by referring to FIG. 3.

At step S601, the control unit 101 initializes a value of a variable i for a loop counter of camera image capture to zero.

At step S602, the control unit 101 transmits an image capture start command to the image capturing apparatus 112 via the network interface 108 by executing the number recognition application program. Accordingly, the image capturing apparatus 112 starts image capture of the display 114, and transmits an obtained captured image to the image processing apparatus 100 via the network 111.

The number recognition application program of the image processing apparatus 100 stores the captured image received via the network interface 108 in the RAM in association with the value of the loop counter i.

At step S603, the control unit 101 executes the number recognition processing to recognize a number displayed by the display 114 from the captured image stored at step S602. Specifically, the control unit 101 uses the method described by referring to FIG. 3.

The control unit 101 stores number information of the display 114 obtained by the number recognition processing in the RAM in association with the value of the loop counter i.

At step S604, the control unit 101 determines the number of loops of the loop counter i stored in the RAM. Here, N is a constant of the maximum number of loops, and in the present embodiment, the number of loops is, for instance, three. In a case where the loop counter i is less than the constant N, the control unit 101 returns the processing to step S602 and repeats the number recognition processing. In a case where the loop counter i is equal to or greater than the constant N, the processing exits the loop and proceeds to the determination processing step of a recognized number.

At step S605, the control unit 101 increments the value of the loop counter i stored in the RAM. The value of the loop counter i is changed, and thus duplication of the captured images acquired at step S602 and duplication of the numbers recognized at step S603 are avoided.

The determination processing steps S606 to S610 are processing in which a number to be output as indication of the display 114 is determined by using the three images captured at step S602 (that is, determine which number among the recognition results of the three images is to be output). Here, FIGS. 7A to 7D illustrate images of the results of image capture with respect to a change of numbers of the display 114. That is, since N at step S604 is three, there are three captured images captured at step S602.

Figure 5:
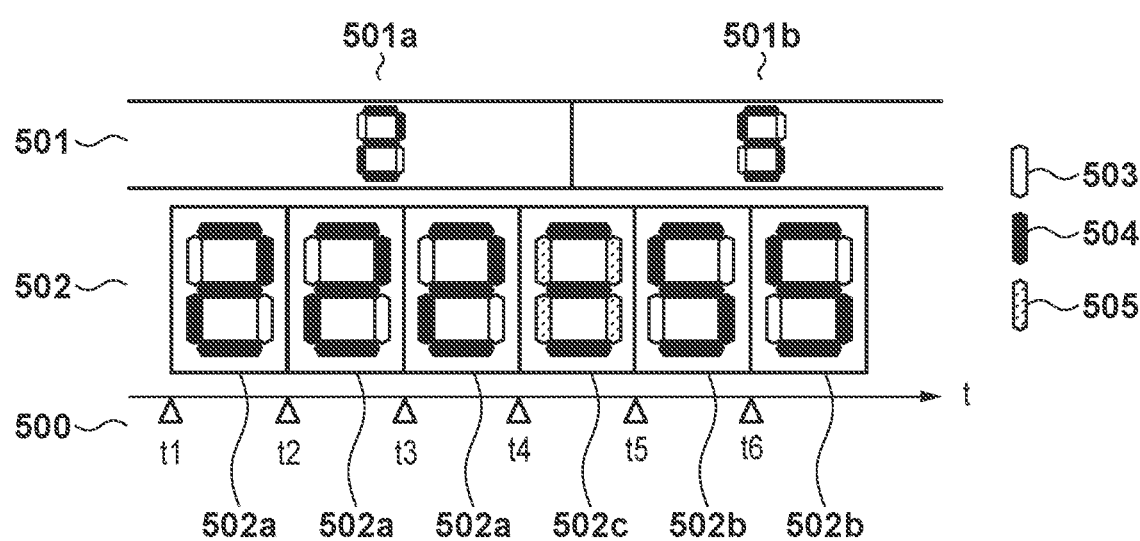
FIG. 5 is a view illustrating a relation between a change of the segment display according to the first embodiment and a captured image captured by an image capturing apparatus.
Figure 7A:
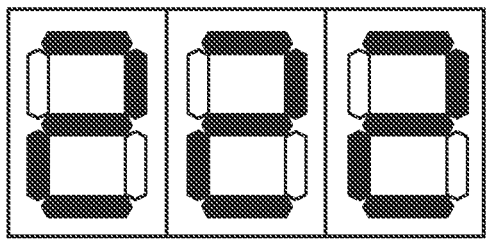
FIGS. 7A to 7D illustrate results of image capture with respect to a change of a number of the segment display according to the first embodiment.

FIG. 7A illustrates three captured images captured at the timing t1 to t3 illustrated in FIG. 5. During the time t1 and t3, a number of a measurement value displayed by the display 114 does not change. Thus, all the images captured are of an identical number.

Figure 7B:
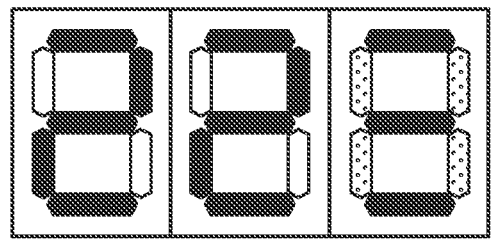

FIG. 7B illustrates three captured images captured at the timing t2 to t4 illustrated in FIG. 5. In the image exposed at the timing t4, a number of a measurement value displayed by the display 114 changes during exposure. Thus, although in two of the three images, a number of a measurement value displayed by the display 114 is captured, but the last one image becomes an image in which an accurate measurement value is not captured due to a change of the display 114 during exposure.

Figure 7C:
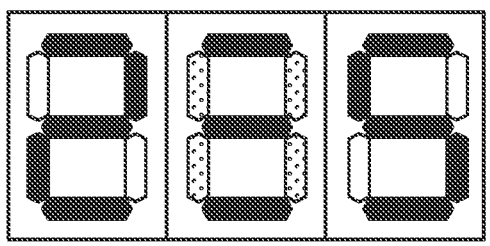

FIG. 7C illustrates three captured images captured at the timing t3 to t5 of FIG. 5. In the image exposed at the timing t4, a number of a measurement value displayed by the display 114 changes during exposure. Thus, the first image of the three images is a captured image in which a number obtained before the number of the measurement value displayed by the display 114 has changed is captured. The second image becomes a captured image in which an accurate measurement value is not captured due to a change of the display 114 during exposure, and the third image becomes a captured image in which a number obtained after the number of the measurement value displayed by the display 114 has changed is captured.

Figure 7D:
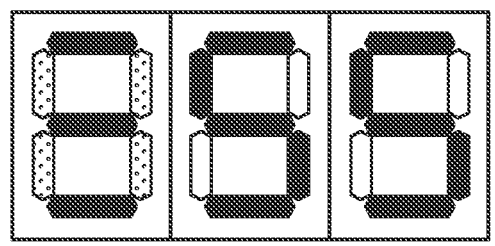

FIG. 7D illustrates three images captured at the timing t4 to 16 of FIG. 5. The image exposed at the timing t4 is the first image in which an accurate measurement value is not captured due to a change of a number of a measurement value displayed by the display 114 during exposure. The subsequent two (second and third) images are captured images in which a number of a measurement value displayed by the display 114 is captured. Here, as described above by referring to FIG. 1, switching time of numbers of the display 114 in the present embodiment is sufficiently shorter than exposure time of the image capturing apparatus 112. Thus, the three images captured by the image capturing apparatus 112 match any one of the four patterns illustrated in FIGS. 7A to 7D (patterns (A) to (D), respectively).

Then, in the determination processing of S606 to S610, the control unit 101 determines a measurement value to be output as indication of the display 114 by determining which of the patterns (A) to (D) the three images captured in time series match.

At step S606, the control unit 101 determines whether or not all the results of the numbers recognized at step S603 are identical. In a case where all the recognized numbers are an identical number, the control unit 101 proceeds to step S607. This case corresponds to the pattern illustrated in FIG. 7A, and all the number recognition results of the three images are identical. Thus, at step S607, the control unit 101 determines that the display 114 has not changed during exposure of the image capturing apparatus 112, and holds, in the RAM, arbitrary recognition result (or constantly the last recognition result) of the three images. On the other hand, in a case where the control unit 101 determines at step S606 that the recognition results are different numbers, the control unit 101 proceeds to step S608.

At step S608, the control unit 101 determines whether or not the numbers recognized at S603 are of two types. In a case where the recognized numbers are of two types, the control unit 101 proceeds to step S609. This case corresponds to the pattern illustrated in FIG. 7B or 7D. That is, since the number recognition results are of two types, it can be determined that the number recognition result of one image is a number recognition result obtained in exposure during a change of the display 114. On the other hand, two images in which the number recognition results are identical can be determined as a number recognition result obtained not during the change. Then, at step S609, the control unit 101 holds, in the RAM, a number recognized from the largest number of images (two, in this case).

On the other hand, in a case where the control unit 101 determines at step S608 that the number recognition result at step S603 is not of two types (that is, three types), the control unit 101 proceeds to step S610. This case corresponds to FIG. 7C. Since the number recognition results are of three types, the control unit 101 can determine that the second number recognition result is a number recognition result obtained in exposure during a change of the display 114. Additionally, it can be determined that the first image is the number recognition result obtained before the display 114 changes, and the third image is the number recognition result obtained after the change. At step S610, the control unit 101 holds the last recognized number. Note that, at step S610, the control unit 101 may hold the first recognized number.

At step S611, the control unit 101 outputs the number recognition result held in the RAM at the immediately preceding step (that is. S607, S609, S610) to an external system as an output determined by the image processing apparatus 100. The control unit 101 may store the determined output as a binary expression of numerical data or as text data in the storage device 105 or the like in the image processing apparatus 100. Additionally, the control unit 101 may save the determined output in a storage medium in the media drive 107, or record the determined output in an external storage medium (such as a database) connected to the network 111. The control unit 101 subsequently ends a series of operations related to the output determination processing.

As described above, in the present embodiment, a character (number) to be output is determined based upon a change aspect in time series of numbers recognized from three captured images of a single character (number) captured in time series. At this time, assuming that the captured images include the captured image exposed during a change of the display 114, it is considered that one erroneous number is recognized in a case where there exist three number recognition results. In a case where two types of numbers are recognized as number recognition results, an identical number recognized from a plurality of images is employed, excluding the number recognized from one image. On the other hand, in a case where three numbers are recognized as number recognition results, an erroneous number obtained in the course of a change appears in the middle image, and thus a numerical value of the image captured last (or first) is employed. In this way, even in a case where an erroneous character due to a change of indication of the display is recognized, an accurate recognition result can be finally output.

Note that in the present embodiment described above, a seven-segment display including seven segments is described and used as an example. However, the present embodiment is also applicable to a 14-segment display including 14 segments, or a 16-segment display including 16 segments. In such a case, the determination processing and the table data of the lighting state of each segment may be changed in accordance with the number of segments.

Additionally, in the present embodiment described above, the case where a character displayed by the display 114 is a number is described and used as an example. However, the above-described processing can be applied to a character such an alphabet and a symbol.

Further, in the present embodiment described above, the case where N at step S604 (that is, the number of images captured in time series) is three is described and used as an example. However, the output determination processing illustrated in FIG. 6 may be performed with N being four or more (the number of images to be captured being four or more). However, it is assumed that measurement by the measuring device is not performed two or more times during capture of N images in the present embodiment.

Further, in the above-described embodiment, the case of separating numbers of the display 114 into single digits and executing the number recognition processing for each digit. However, a number recognition processing method in which numbers displayed by a display in an image are recognized at one time may be employed, instead of performing the number recognition processing for each digit.

Additionally, in the above-described embodiment, the method of recognizing a number based upon a so-called rule-based algorithm that applies the lighting state and the non-lighting state of a segment to the pattern illustrated in FIG. 4. However, the number recognition processing may not necessarily be recognized by the rule-based algorithm. For instance, a method in which an image of the display 114 is learned in advance by using machine learning, and a displayed number (character) is recognized from a captured image of the display 114 may be used. As the method that uses machine learning, for instance, a method in which a number (character) is recognized by using a deep neural network including a convolutional layer (for instance, Convolutional Neural Network) may be used. In this way, a number (character) can be recognized based upon a pattern of the lighting state and the non-lighting state of a segment, without manually providing an amount of characteristics or algorithm in advance.

In the above-described example, the case of recognizing a maximum of three numbers from three captured images is described and used as an example. However, similar processing can also be applied to the case where a result of an unrecognizable number is obtained. That is, when a recognition result of an unrecognizable number is obtained, the result may be treated equally to the case where one type of character is recognized.

Second Embodiment

Next, a second embodiment will be described. Although the second embodiment differs from the first embodiment in terms of a part of the operation of the number determination processing, other components or processing are similar to those of the first embodiment. That is, components of an image processing system and number recognition processing with respect to indication of a display 114 are similar to those of the first embodiment. Thus, identical or substantially identical components will be denoted by identical reference signs, and description of these components will be omitted. Description will be made focusing on different components.

Figure 8:
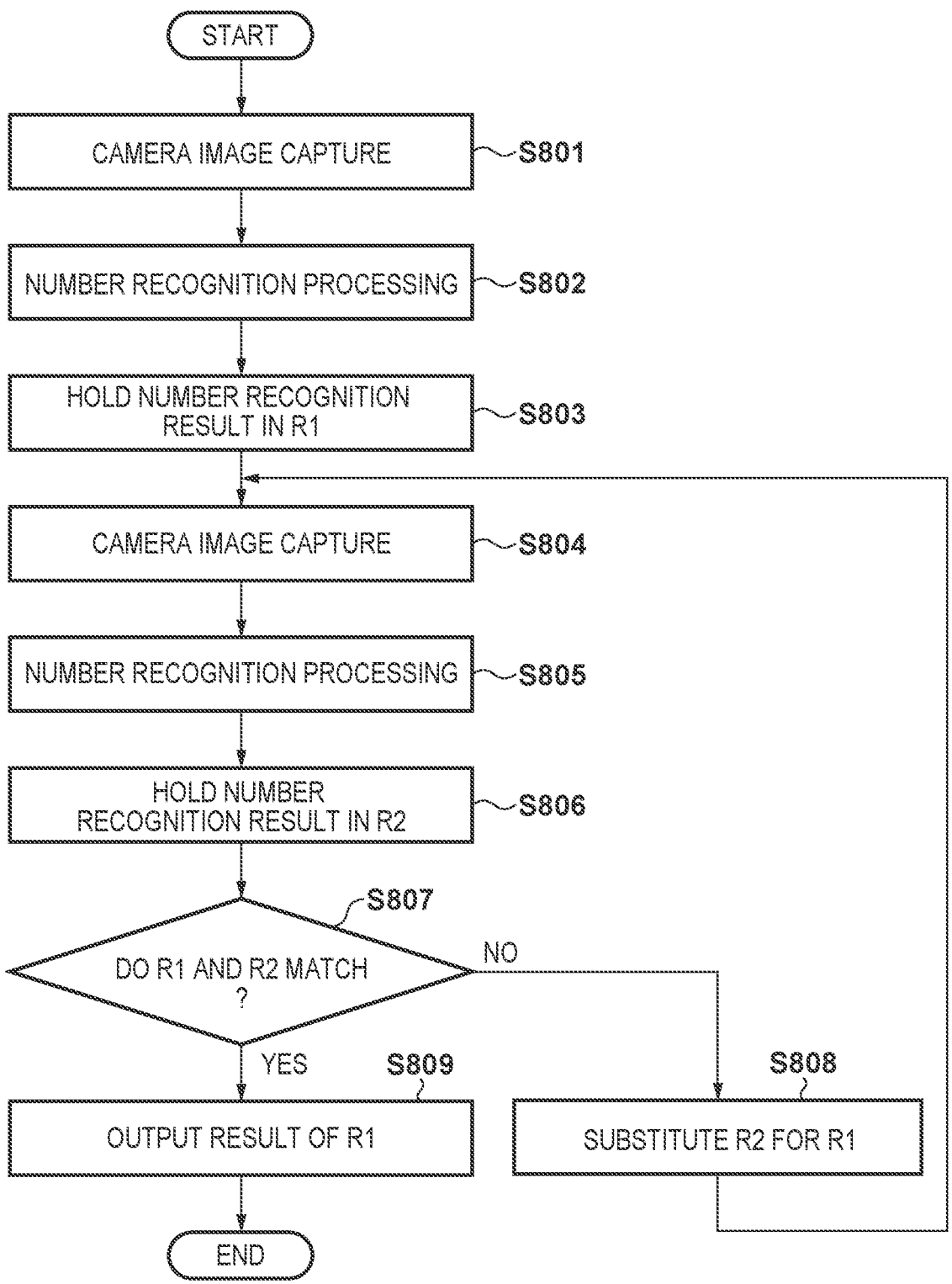
FIG. 8 is a flowchart illustrating a sequence of operations of output determination processing of an image processing apparatus according to a second embodiment.

Series of Operations Related to Output Determination Processing Using Time Series Images A series of operations related to output determination processing using time series images according to the present embodiment will be described by referring to FIG. 8.

At step S801, a control unit 101 transmits an image capture start command to an image capturing apparatus 112, in a similar manner to step S602 described above. In response to this, the image capturing apparatus 112 captures indication of the display 114, and transmits obtained image data to an image processing apparatus 100 via a network 111. The control unit 101 stores, in a RAM, the image data received from the image capturing apparatus 112.

At step S802, the control unit 101 executes number recognition processing for recognizing a number displayed by the display 114 from the image data stored at S801. At this time, the control unit 101 executes the number recognition processing described above in the first embodiment. Then, at step S803, the control unit 101 holds the number recognized at S802 in a variable R1 reserved in the RAM.

Next, at step S804, the control unit 101 stores image data captured by the image capturing apparatus 112 in a similar manner to S801, and further, the control unit 101 executes at step S805 the number recognition processing on the stored image data in a similar manner to S802. Then, at step S806, the control unit 101 holds the number recognized at S805 in a variable R2 reserved in the RAM.

That is, at steps S801 to S806, processing of holding the result obtained by performing the number recognition processing on a preceding image of successive time series images, and the result obtained by performing the number recognition processing on a subsequent image in the variables R1 and R2, respectively.

At step S807, the control unit 101 executes determination processing in which R1 and R2 that are the number recognition results held at S803 and S806 are compared. In a case where the control unit 101 determines that R1 and R2 do not match, the control unit 101 determines that indication of the display 114 has changed during execution of the number recognition processing, and proceeds the processing to step S808. At step S808, the control unit 101 substitutes R2 that is a result of subsequent recognition into the variable of R1. The control unit 101 proceeds to S804 after completion of the processing at step S808, and repeats the processing until recognition results match in the determination at S807. In this way, a correct number can be output and determined when an identical recognition result is successively obtained while dynamically changing the number of a plurality of time series captured images.

On the other hand, in a case where the control unit 101 determines that R1 and R2 match at step S807, the control unit 101 proceeds the processing to step S809. At step S809, the control unit 101 determines that the recognition result R1 is a number displayed by the display 114, and outputs the recognition result R1 to an external system. It is needless to say that the result to be output may be the result held in R2.

Note that the control unit 101 may store the determination result as a binary expression of numerical data, or as text data in a storage device 105 or the like in the image processing apparatus 100. Additionally, the determination result may be stored in a storage medium in a media drive 107, or may be recorded in an external storage medium (such as a database) connected to the network 111.

As described above, similarly, according to the present embodiment, a displayed character (number) is determined based upon successive captured images of a single character (number) captured in time series. At this time, assuming that the captured images may include the captured image exposed during a change of the display 114, it is considered that an erroneous number is recognized in a case where successive number recognition results do not match each other. On the contrary, in a case where successive number recognition results match each other, it is determined that there is a correct number recognition result without any erroneously recognized number and the number recognition result is employed as an output. In this way, even in a case where an erroneous character due to a change of indication of a display is recognized, a finally accurate recognition result can be output.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239276, filed Dec. 27, 2019 which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
a recognition unit configured to acquire a plurality of captured images of characters captured in time series, each of the characters including a plurality of segments and that changes in time series, and recognize the characters captured for each of the plurality of captured images; and a determination unit configured to determine which one of the characters recognized from each of the plurality of captured images is to be output, wherein the determination unit determines, in accordance with which one of a first aspect, a second aspect and a third aspect a change in time series of the characters recognized from each of the plurality of captured images is, which one of the characters recognized from each of the plurality of captured images is to be output.

2. The image processing apparatus according to claim 1, wherein, in a case where the characters recognized from each of the plurality of captured images are three types of characters, which corresponds to the first aspect, the determination unit determines, among the characters recognized from each of the plurality of captured images, a character recognized from a last captured image as a character to be output.

3. The image processing apparatus according to claim 1, wherein, in a case where the characters recognized from each of the plurality of captured images are two types of characters, which corresponds to the second aspect, the determination unit determines, among the characters recognized from each of the plurality of captured images, a character recognized from the largest number of images as a character to be output.

4. The image processing apparatus according to claim 1, wherein, in a case where the characters recognized from each of the plurality of captured images are an identical character, which corresponds to the third aspect, the determination unit determines the recognized character as a character to be output.

5. The image processing apparatus according to claim 1, wherein the single character includes 7, 14, or 16 segments and is displayed by a display.

6. The image processing apparatus according to claim 1, wherein the recognition unit recognizes the single character in accordance with patterns of a lighting state and a non-lighting state of the plurality of segments.

7. An image processing system comprising:
   an image capturing unit configured to generate a plurality of captured images of characters captured in time series, each of the characters including a plurality of segments; and
   an image processing apparatus comprising:
   one or more processors; and
   a memory storing instructions which, when the instructions are executed by the one or more processors, cause the image processing apparatus to function as:
      a recognition unit configured to acquire a plurality of captured images of characters captured in time series, each of the characters including a plurality of segments and that changes in time series, and recognize the characters captured for each of the plurality of captured images; and
      a determination unit configured to determine which one of the characters recognized from each of the plurality of captured images is to be output,
      wherein the determination unit determines, in accordance with which one of a first aspect, a second aspect and a third aspect a change in time series of the characters recognized from each of the plurality of captured images is, which one of the characters recognized from each of the plurality of captured images is to be output.

8. A control method of an image processing apparatus, the control method comprising:
   acquiring a plurality of captured images of characters captured in time series, each of the characters including a plurality of segments and that changes in time series, and recognizing the characters captured for each of the plurality of captured images; and
   determining which one of the characters recognized from each of the plurality of captured images is to be output,
   wherein the determining includes determining, in accordance with which one of a first aspect, a second aspect and a third aspect a change in time series of the characters recognized from each of the plurality of captured images is, which one of the characters recognized from each of the plurality of captured images is to be output.

9. A non-transitory computer-readable storage medium comprising instructions for performing the control method of an image processing apparatus, the control method comprising:
   acquiring a plurality of captured images of characters captured in time series, each of the characters including a plurality of segments and that changes in time series, and recognizing the characters captured for each of the plurality of captured images; and
   determining which one of the characters recognized from each of the plurality of captured images is to be output,
   wherein the determining includes determining, in accordance with which one of a first aspect, a second aspect and a third aspect a change in time series of the characters recognized from each of the plurality of captured images is, which one of the characters recognized from each of the plurality of captured images is to be output.

* * * * *